(12) United States Patent
Cassidy et al.

(10) Patent No.: US 7,627,224 B1
(45) Date of Patent: Dec. 1, 2009

(54) CABINET FIBER MANAGER

(75) Inventors: Michael Cassidy, Santa Clara, CA (US); David L. Funston, Wichita, KS (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

(21) Appl. No.: 12/343,819

(22) Filed: Dec. 24, 2008

(51) Int. Cl.
 *G02B 6/00* (2006.01)
(52) U.S. Cl. ...................................... 385/135; 385/134
(58) Field of Classification Search .................. 385/135, 385/137; 174/50
 See application file for complete search history.

(56) References Cited

U.S. PATENT DOCUMENTS

| | | | |
|---|---|---|---|
| 5,092,663 A | 3/1992 | Hivner | |
| 5,142,606 A * | 8/1992 | Carney et al. | 385/134 |
| 5,335,349 A * | 8/1994 | Kutsch et al. | 375/257 |
| 5,867,624 A | 2/1999 | Forrester et al. | |
| 5,923,753 A * | 7/1999 | Haataja et al. | 379/438 |
| 5,937,131 A * | 8/1999 | Haataja et al. | 385/136 |
| 6,002,089 A * | 12/1999 | Hemingway et al. | 174/97 |
| 6,192,181 B1 * | 2/2001 | Haataja et al. | 385/136 |
| 6,215,937 B1 | 4/2001 | Dinh | |
| 6,263,144 B1 | 7/2001 | Daoud | |
| 6,284,975 B1 * | 9/2001 | McCord et al. | 174/71 R |
| 6,289,160 B1 | 9/2001 | Daoud | |
| 6,311,006 B1 | 10/2001 | Forrester et al. | |
| 6,311,007 B1 | 10/2001 | Daoud | |
| D450,042 S | 11/2001 | Kaplan | |
| 6,314,230 B1 | 11/2001 | Daoud et al. | |
| 6,344,614 B1 | 2/2002 | Sutehall et al. | |
| 6,349,893 B1 | 2/2002 | Daoud | |
| 6,351,591 B1 | 2/2002 | Daoud | |
| 6,385,381 B1 | 5/2002 | Janus et al. | |
| 6,389,211 B1 | 5/2002 | Mandry et al. | |
| 6,487,356 B1 | 11/2002 | Harrison et al. | |
| 6,511,009 B1 | 1/2003 | Harrison et al. | |
| 6,522,823 B1 * | 2/2003 | Wentworth et al. | 385/134 |
| 6,535,683 B1 * | 3/2003 | Johnson et al. | 385/136 |
| 6,546,181 B1 * | 4/2003 | Adapathya et al. | 385/135 |
| 6,567,607 B2 | 5/2003 | Ando et al. | |
| 6,580,866 B2 | 6/2003 | Daoud et al. | |
| 6,603,918 B2 | 8/2003 | Daoud et al. | |
| 6,625,374 B2 | 9/2003 | Holman et al. | |
| 6,631,875 B1 * | 10/2003 | Kampf et al. | 248/68.1 |
| 6,633,718 B1 * | 10/2003 | Thom | 385/136 |
| 6,708,918 B2 * | 3/2004 | Ferris et al. | 242/615 |
| 6,711,339 B2 * | 3/2004 | Puetz et al. | 385/135 |
| 6,724,970 B2 * | 4/2004 | Adapathya et al. | 385/135 |
| 6,738,554 B2 | 5/2004 | Daoud et al. | |

(Continued)

*Primary Examiner*—Ryan Lepisto
(74) *Attorney, Agent, or Firm*—Hoffmann & Baron, LLP

(57) ABSTRACT

An apparatus for storing and routing a fiber optic cable to an equipment cabinet is described. The apparatus includes a storage tray having a planar surface for accommodating the fiber optic cable. The tray is mounted to an upper end of the equipment cabinet. The tray has a plurality of routing channels extending along the planar surface and a portion thereof extending along at least one surface of the equipment cabinet generally perpendicular to the planar surface, with each of the routing channels defining a minimum bend radius to restrict over bending of the fiber optic cable. The tray has a central portion for accommodating the fiber optic cable, and the plurality of routing channels are in communication with the central portion and extending downward towards equipment supported by the equipment cabinet.

13 Claims, 7 Drawing Sheets

U.S. PATENT DOCUMENTS

| | | | |
|---|---|---|---|
| 6,739,795 B1 * | 5/2004 | Haataja et al. | 403/387 |
| 6,868,218 B2 | 3/2005 | Daoud et al. | |
| 6,898,363 B2 | 5/2005 | Forrester et al. | |
| 6,915,059 B2 | 7/2005 | Daoud et al. | |
| 7,049,507 B2 | 5/2006 | Sutehall et al. | |
| 7,085,468 B2 | 8/2006 | Forrester | |
| 7,155,104 B2 * | 12/2006 | Wentworth et al. | 385/134 |
| 7,184,644 B2 * | 2/2007 | Johnson et al. | 385/134 |
| 7,315,680 B1 * | 1/2008 | Rapp et al. | 385/134 |
| 7,382,961 B2 * | 6/2008 | Xin et al. | 385/135 |
| 7,383,634 B2 * | 6/2008 | Haataja et al. | 29/897.3 |
| 7,471,868 B2 * | 12/2008 | Bayazit et al. | 385/136 |
| 2006/0269210 A1 * | 11/2006 | Waszak | 385/136 |

\* cited by examiner

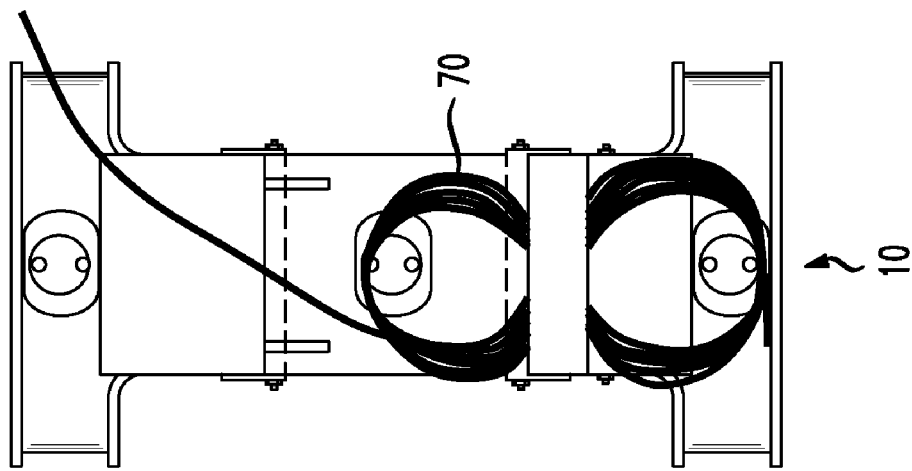
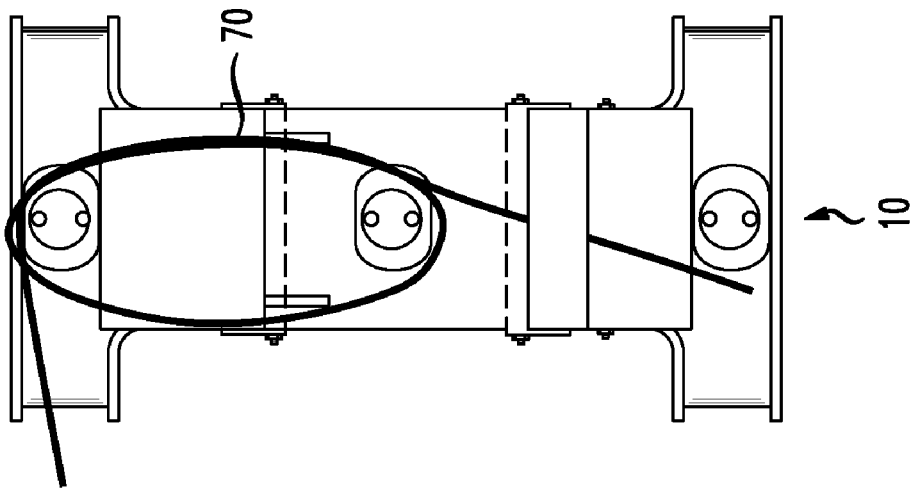
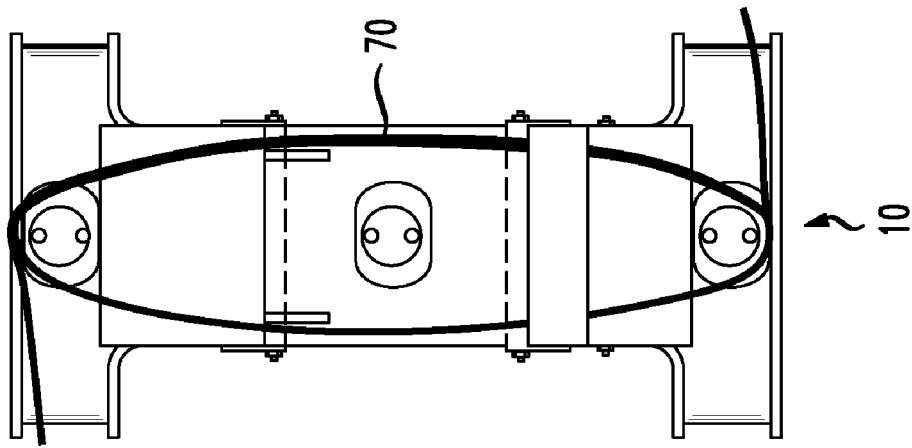

CABINET FIBER MANAGER

BACKGROUND

1. Field

The present application relates to an apparatus for storing cable. More particularly, the present application relates to an apparatus for storing slack from fiber optic cable on top of a cabinet and provides for routing of cable to any of at least four corners of an equipment cabinet.

2. Brief Description of the Related Art

Fiber optic cable is a preferred transmission medium for most data and voice communications. A few reasons why fiber is preferred include its small size, immunity to electromagnetic interference, and bandwidth. Unfortunately, fiber optic cable is physically less robust than copper-based cable. Thus, fiber optic cable requires greater care when routing the fiber between various pieces of equipment, within equipment cabinets in a communications equipment room, or elsewhere.

A primary concern when working with fiber optic cable is maintaining a minimum bend radius as the cable is routed. Bending the fiber optic cable too much risks damaging the fiber optic cable, and may also adversely affect the optical characteristics of the cable. Thus, improper bending may degrade the optical signal propagating through a fiber optic cable, which could result in degradation to the voice or data represented by the optical signal.

Fiber optic cable routing usually requires routing between adjacent pieces of equipment and between different sides, including the front and back, of the equipment depending on the location where the cable must be connected to the equipment. In a communications room, fiber optic cable may be routed into the room and to a specific piece of equipment. Alternatively, fiber optic cable may be routed between and among various pieces of equipment in the room. It is not uncommon for fiber optic cable to be routed between adjacently positioned pieces of communications equipment and between the front and back of a piece of equipment, depending on where the connections need to be made.

It is also often necessary to splice already-installed fiber optic cable to provide for connection to a different end-point. Splices typically require removal of a section of the fiber optic cable, causing the length of the cable to change (i.e., shorten). Since fiber optic cable is typically installed with a certain amount of slack in the fiber optic cable, splicing changes the amount of slack that must be accommodated. Following a splice it thus becomes necessary to accommodate a different length of fiber optic cable.

Such a problem is particularly evident when routing fiber optic cable in an equipment cabinet. In the cabinet, routing fiber optic cable to different sections or surfaces of the cabinet, while maintaining the minimum bend radius to assure proper signal propagation, is often difficult and in some instances may not even be possible.

For example, a communications room may house servers, routers, and switches with fiber optic cable entering the location via troughs that drop into a tray attached to the top or upper portion of an equipment cabinet. The troughs are typically located over the front of one or more equipment cabinets and the troughs are made of extruded plastic, with drops constructed of corrugated tubing leading down into the equipment cabinet. The problem arises when the fiber optic cable needs to be attached to ports located in the back of equipment cabinets because the fiber optic cable must only be bent within the bend radius and the excess must be properly stored. Therefore, it would be advantageous to provide a fiber optic cable routing and storage device that accommodates fiber optic cable slack and allows for the routing of the fiber optic cable to all sides of an equipment cabinet, while ensuring the minimum bend radius for the fiber optic cable between and among various pieces of communication equipment, including adjacently positioned equipment and multiple sides of a piece of equipment, such as the front and back of the equipment cabinet.

SUMMARY

The present application describes an apparatus, a system, and a method for storing and routing a fiber optic cable to an equipment cabinet.

The apparatus includes a storage tray having a planar surface for accommodating the fiber optic cable. The tray being mounted to an upper end of the equipment cabinet. The tray having a plurality of routing channels extending along the planar surface and having a portion thereof extending along at least one surface of the equipment cabinet generally perpendicular to the planar surface, with each of the routing channels defining a minimum bend radius to restrict over bending of the fiber optic cable. The tray having a central portion for accommodating the fiber optic cable, and the plurality of routing channels being in communication with the central portion and extending downward towards equipment supported by the equipment cabinet.

The system for routing and storing fiber optic cable includes an equipment cabinet and a storage tray. The tray having a planar surface for accommodating the fiber optic cable, with the tray being mounted to an upper end of the equipment cabinet. The tray including a plurality of routing channels extending along the planar surface and having a portion thereof extending along at least one surface of the equipment cabinet generally perpendicular to the planar surface, with each of the routing channels defining a minimum bend radius to restrict over bending of the fiber optic cable. The tray further including a central portion for accommodating fiber optic cable, with the plurality of routing channels being in communication with the central portion and extending downward towards equipment supported by the equipment cabinet. The tray is configured to be attached to the equipment cabinet.

The method first includes mounting a storage tray to an upper end of the equipment cabinet. The tray having a planar surface for accommodating the fiber optic cable, a plurality of routing channels extending along the planar surface, and a portion thereof extending along at least one surface of the equipment cabinet generally perpendicular to the planar surface with each of the routing channels defining a minimum bend radius to restrict over bending of the fiber optic cable. The tray further includes a central portion for accommodating the fiber optic cable, with the plurality of routing channels being in communication with the central portion and extending downward towards equipment supported by the equipment cabinet. The central portion having three sections, a front portion, a rear portion, and a common portion, the front portion being configured to be adjustably attached to one side of the common portion and the rear portion being configured to be adjustably attached to an opposite side of the common portion. The central portion being configured to allow the common portion to adjustably extend between the front portion and the rear portion to customize the tray for placement on the equipment cabinet. The tray also includes at least one end panel extending upwards and away from the tray in a direction perpendicular to the planar surface of the tray, two side panels extending upwards and away from the tray in a direction perpendicular to the planar surface of the tray, and at least one spool extending from the tray generally perpendicular to and away from the planar surface of the tray. The at least one spool includes a spool body having an arcuate surface and a spool cover with a planar surface perpendicular to the spool body 34. The tray also includes a transition panel extending upward and away from the planar surface of the tray with a first portion being a planar surface and a second portion extending from the first portion upward and away from the planar surface of the first portion, the transition panel being configured to conform to the bend radius requirements to prevent over bending of the fiber optic cable. The method next includes routing the fiber optic cable into the tray and using the spools to store the excess fiber optic cable. After that, the method routes the fiber optic cable to one of the routing channels. Finally, the method connects the fiber optic cable to a piece of equipment in the equipment cabinet.

Other objects and features of the present application will become apparent from the following detailed description considered in conjunction with the accompanying drawings. It is to be understood, however, that the drawings are designed as an illustration only and not as a definition of the limits of the application.

BRIEF DESCRIPTION OF THE DRAWINGS

FIGS. 5A-5C show the tray of FIG. 1 with fiber optic cable being stored and routed in various ways.

DETAILED DESCRIPTION

Figure 1:
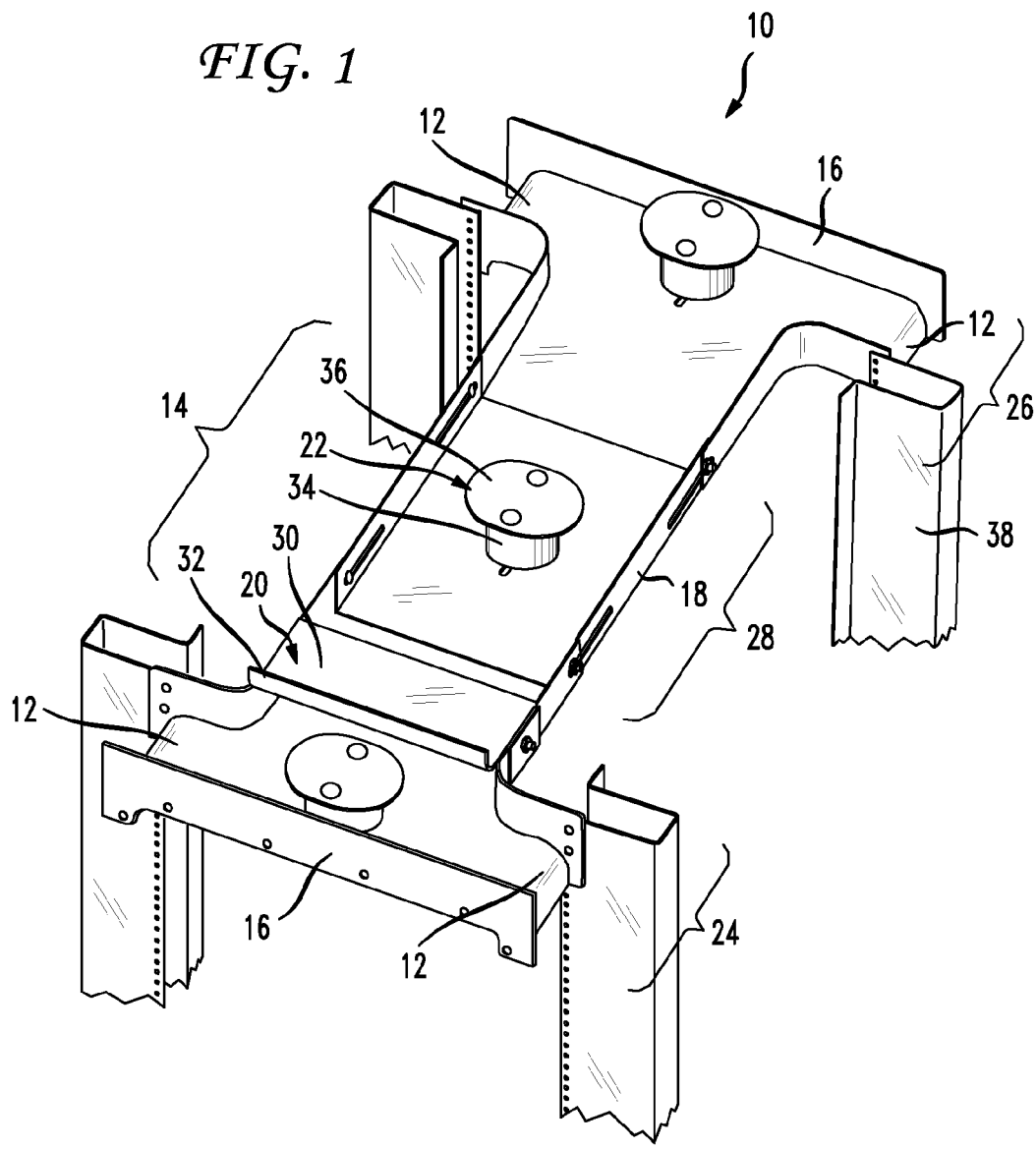
FIG. 1 depicts a tray with four routing channels of a cabinet fiber manager attached to an equipment cabinet.
Figure 2:
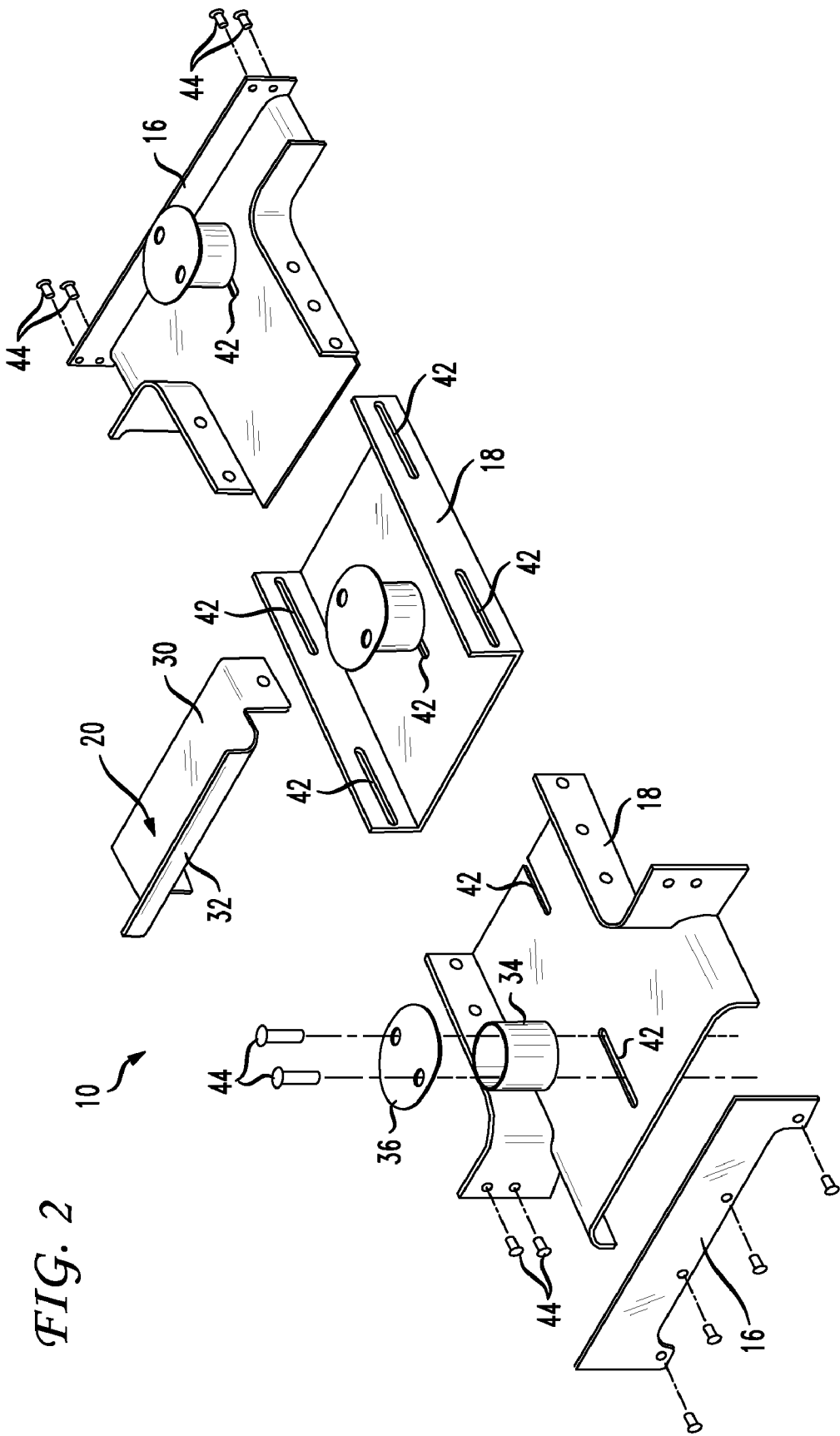
FIG. 2 depicts an exploded view of the tray of FIG. 1.

The present application describes an apparatus for storing and routing fiber optic cable to a plurality of surfaces of an equipment cabinet. With reference to FIGS. 1 and 2, an embodiment of the present application is shown. FIGS. 1 and 2 provide a storage tray 10 (also referred to as a tray) with a plurality of routing channels 12 extending along the planar surface and having a portion thereof extending along at least one surface of the equipment cabinet generally perpendicular to the planar surface. Each routing channel defining a minimum bend radius to restrict over bending of the cable, and a central portion 14 for accommodating the fiber optic cable. The tray may further include at least one end panel 16, at least one side panel 18, a transition panel 20, and one or more spools 22.

The routing channels 12 extend along the planar surface and have a portion extending along at least one surface of the equipment cabinet. The portion extending along the cabinet surfaces are generally perpendicular to the planar surface. The routing channels 12 are designed to conform to bend radius requirements of the cable. The minimum inside bending radius of fiber optic cable (Optical Fiber Nonconductive Riser or OFNR) is the larger of 1.5 inches or 10 times the cable diameter.

The central portion 14 may include multiple sections. For example, in FIG. 1, the central portion 14 includes a front portion section 24, a rear portion section 26, and a common portion section 28. The front and rear portion sections 24, 26 are configured to be adjustably attached to the common portion 28, allowing the common portion 28 to adjustably extend between the front and rear portions sections 24, 26. The tray 10 is configured to provide slots 42 on the central portion 14 and/or side walls 18. The slots 42 are configured to allow a variety of fasteners 44 to be used to assemble the sections 24, 26, 28 of the tray 10, yet provide the ability to adjust the tray 10 size to fit most equipment cabinets. The varieties of fasteners include, but are not limited to, bolts, nuts, screws, and washers. The tray 10 is also configured to provide for customizing the placement of the spools 22, to accommodate for the routing and storing of a variety of fiber optic cable lengths.

The end panels 16 and the side panels 18 extend upwards and away from the tray 10 in a direction perpendicular to the tray 10. The transition panel 20 extends upward and away from the tray 10 with a first portion 30 being a planar surface in a direction parallel to the tray 10, and a second portion 32 extending from the first portion 30 upward and away from the tray 10 in a direction perpendicular to the tray 10. The second portion 32 is configured to conform to the bend radius requirements to prevent over bending of the cable. For example, the transition panel 20 configuration provides the ability to route the cable from the front of an equipment cabinet to the back of the equipment cabinet. The benefit from such a configuration includes the flexibility to route the fiber optic cable directly from the troughs, in the front of the equipment cabinet to the back of the equipment cabinet to attach the fiber optic cable; and to route the cable with the slack being wrapped around the spools and then being routed to the back of the equipment cabinet.

The spools 22 include a spool body 34 and a cover 36. The spool body 34 extends from the tray 10 in the direction generally perpendicular to and away from the plane of the tray. The spool body 34 is has an arcuate surface to enable the cable to be wrapped around the spool body 34 and conform to the bend radius requirements. The cover 36 is a planar surface extending from the spool body 34 in the direction generally perpendicular to the spool body 34.

FIG. 1 further provides an example of an equipment cabinet 38, which the tray 10 may be attached to the upper portion of the cabinet 38. For example, the tray 10 may be configured to be mounted to an upper end of the equipment cabinet 38 with four-posts and configured to receive 19" equipment, such as a standard two post equipment frame. The tray 10 may be expanded to accommodate mounting rails positioned from 18" to 30" apart with overall dimensions of 20" to 40". The tray 10 may require 2 rack units (RU) of rack space in a 19" mounting configuration, using an equipment cabinet with Electronic Industries Association (EIA) 1.75" hole spacing. This configuration provides four routing channels 12 and may provide four cable drop positions, such that cable may be delivered to both sides of the front and back of the equipment cabinet.

The size of the tray contemplated by the present application is generally a two rack unit high tray, which is approximately 3.5 inches high. As one skilled in the art will appreciate, the tray 10 may be designed to take tip as little room as possible, without compromising the tray's ability to store and route the fiber optic cable within the bend radius requirements, and the tray 10 may be adapted as long as the bend radius requirement are not compromised.

Figure 3:
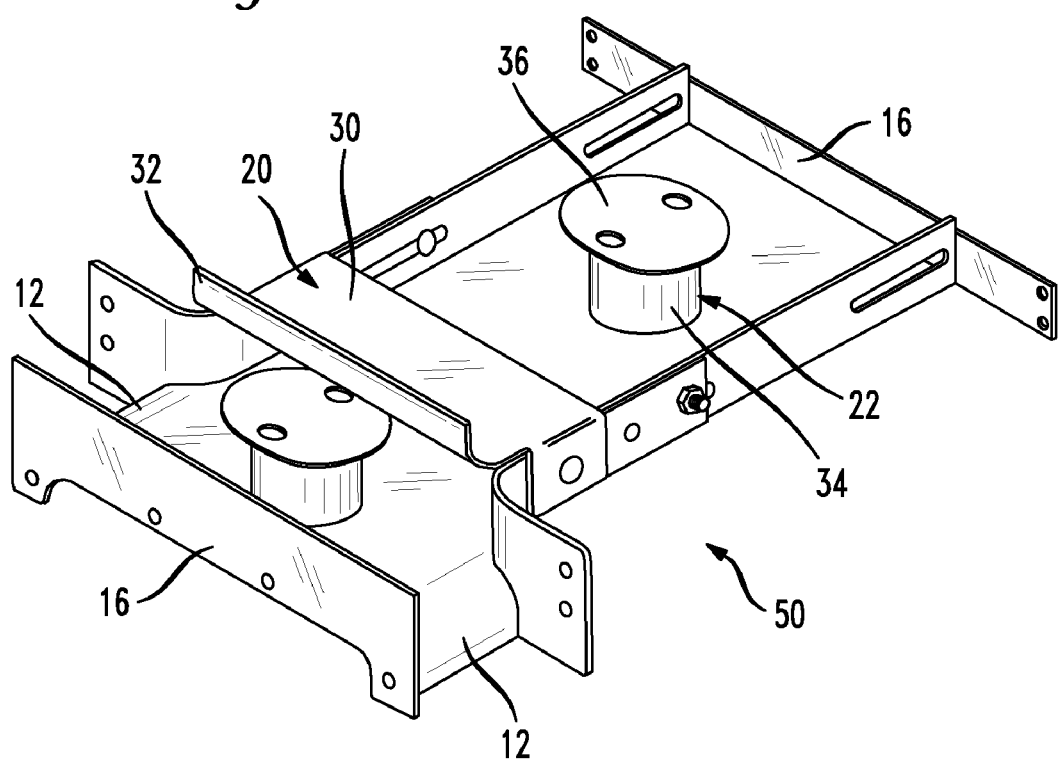
FIG. 3 depicts a second embodiment of a tray with two routing channels.

FIG. 3 provides a second embodiment of a tray 50 with two spools 22, a transition panel 20, and two routing channels 12. For example, the tray 50 may be configured to be attached to the equipment cabinet 38 with 19" equipment. The tray 50 may be expandable to accommodate mounting rails positioned from 16" to 25" apart, with overall dimensions of 21" to 30". The tray 50 may require two rack units of rack space in a 19" mounting configuration and the tray 50 will mount to 1.75" hole spacing (EIA). The tray 50 provides cable delivery to both sides of the back of the equipment cabinet 38 to accommodate two routing channels 12 to drop cable in two positions.

Figure 4:
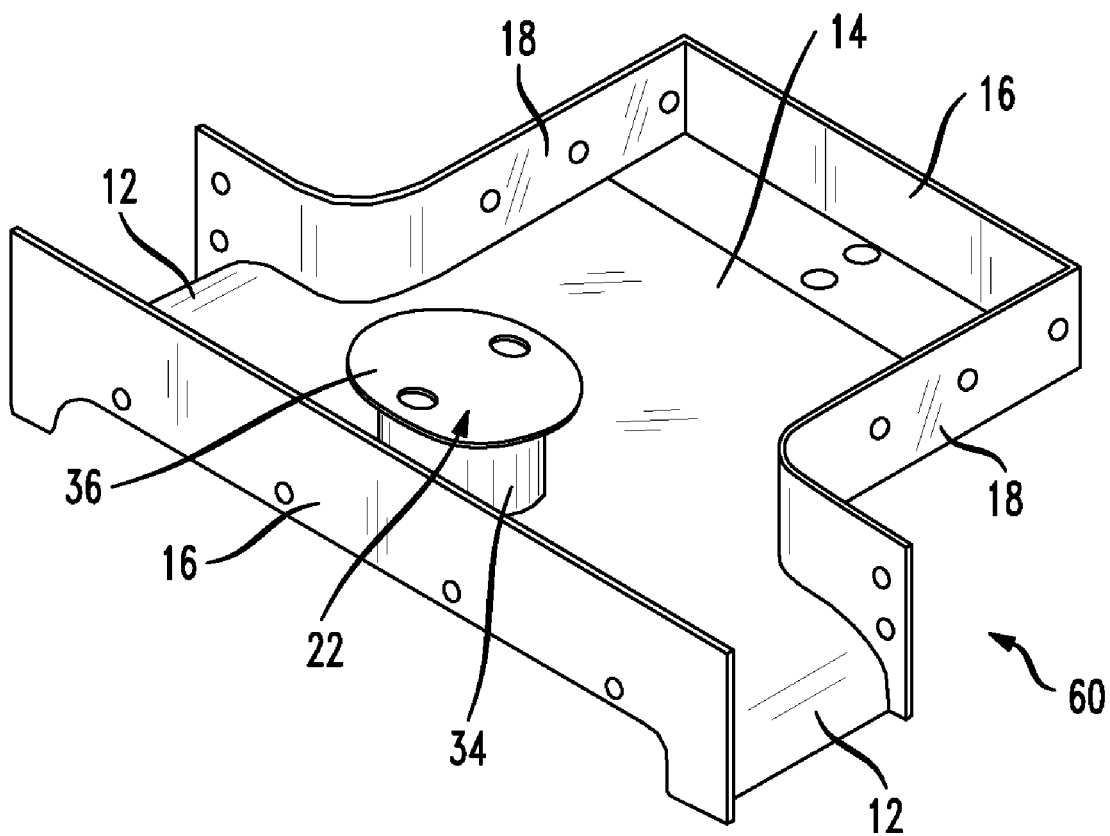
FIG. 4 depicts a third embodiment of a tray with two routing channels.

FIG. 4 provides a third embodiment of a tray 60 with one spool 20 and two routing channels 12. For example, the tray 60 may be configured to be attached to the equipment cabinet 38 with 19" equipment. The tray 60 may require two rack units of rack space in a 19" mounting configuration and the tray 60 will mount to 1.75" hole spacing (EIA). The tray 60 provides cable delivery to both sides of the back or front of the equipment cabinet 38 to accommodate two routing channels 12 to drop cable in two positions.

Figure 6:
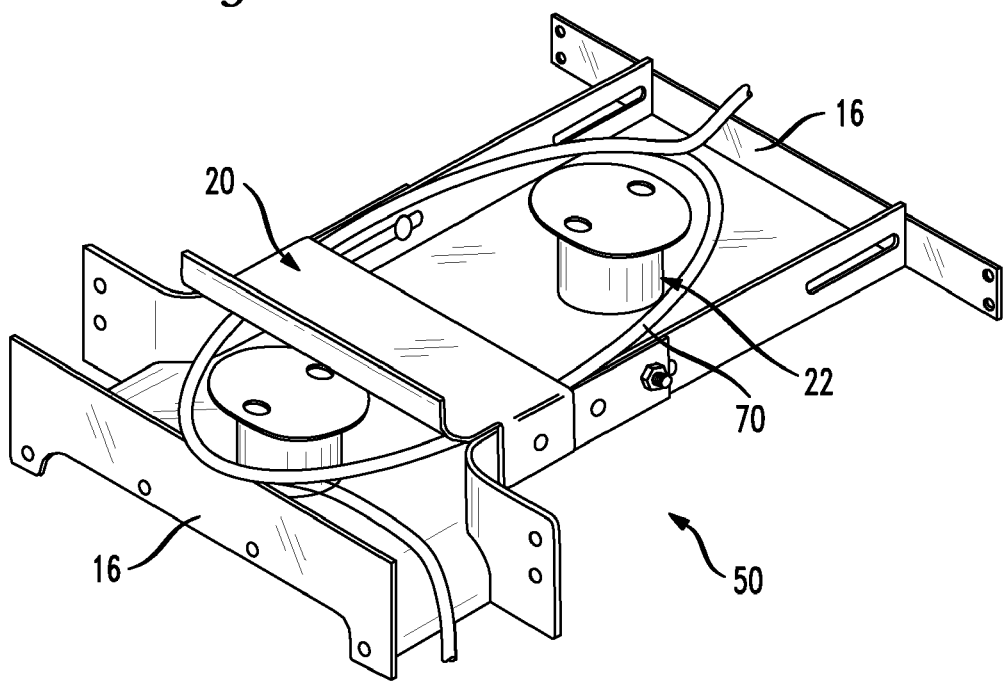
FIG. 6 depicts the tray of FIG. 3 with an example of fiber optic cable being stored and routed.
Figure 7:
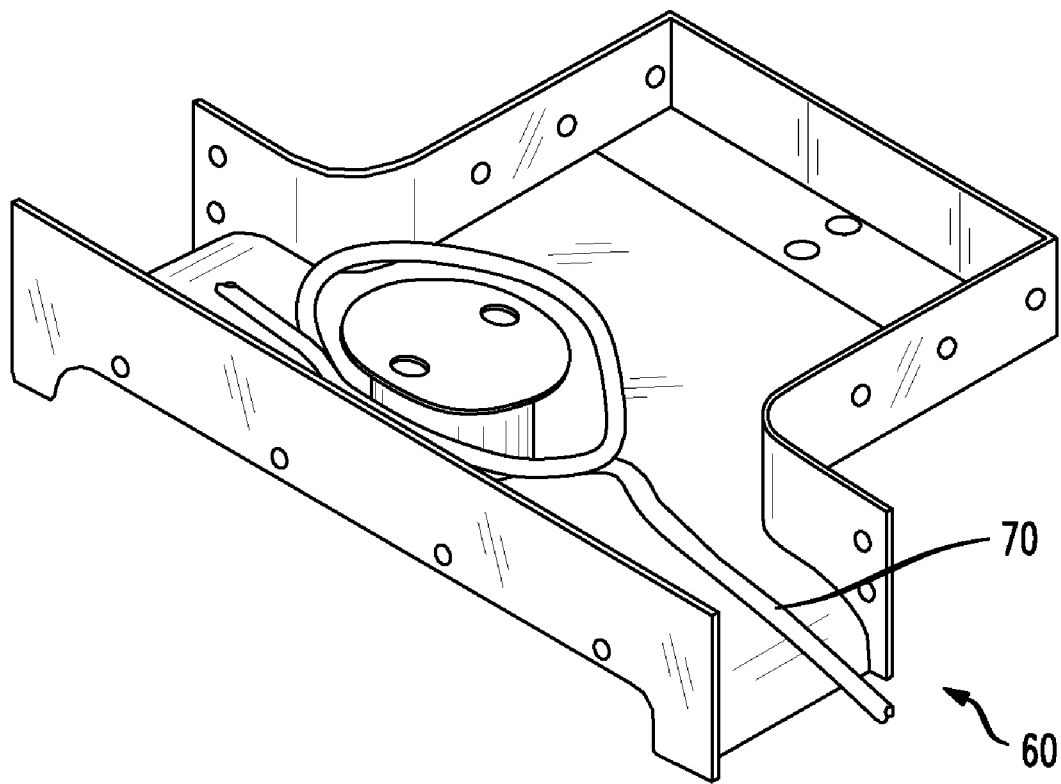
FIG. 7 depicts the tray of FIG. 4 with an example of how fiber optic cable may be stored and routed.

FIGS. 5, 6, and 7 provide examples of the above trays 10, 50, 60 with fiber optic cable 70. The cable 70 may be dropped from the troughs into the tray and then the slack may be wrapped around the spools and routed to the desired corner of the front or back of the equipment cabinet 38. For example, in FIG. 5A the cable 70 may be dropped into the front of the tray 10 and the slack may be wrapped around the front and back spools 22 and then routing to the back left routing channel 12 to drop the cable into the proper location behind the equipment.

FIG. 5B shows a further example of the routing of the cable 70 with the cable 70 being guided from the troughs under the transition panel 20 with the slack cable 70 wrapped around the middle and back spools 22 and may then be routed to the back left routing channel 12. FIG. 5C shows yet a further example of how the cable 70 may be routed. In FIG. 5C, the cable 70 is dropped from the troughs in the front of the tray 10, wrapped in a figure eight around the front and middle spools 22, and routed to the back right routing channel 12.

FIG. 6 provides a further example of the routing of the cable 70 on tray 50, with the cable being wrapped around the two spools 22 and then sent down the front right routing channel 12. FIG. 7, also provides an example of the tray 60 with the cable 70 wrapped around the spool 22 and routed to the routing channel 12 on the front right side of the equipment cabinet 38.

It will be appreciated that the present invention has been described herein with reference to certain preferred or exemplary embodiments. The preferred or exemplary embodiments described herein may be modified, changed, added to or deviated from without departing from the intent, spirit and scope of the present invention, and it is intended that all such additions, modifications, amendment and/or deviations be included within the scope of the following claims.

What is claimed is:

1. An apparatus for storing a fiber optic cable and routing the fiber optic cable to an equipment cabinet comprising:
   a tray having a planar surface to receive the fiber optic cable, the tray being mounted to an upper end of the equipment cabinet, the tray having a plurality of routing channels extending along the planar surface, a portion of the routing channels extending along at least one surface of the equipment cabinet generally perpendicular to the planar surface, each of the routing channels defining a bend radius greater than or equal to a minimum bend radius to restrict over bending of the fiber optic cable, the tray having a central portion to receive the fiber optic cable, the plurality of routing channels being in communication with the central portion and extending downward towards equipment supported by the equipment cabinet, wherein the tray further includes
      at least one end panel extending upwards and away from an end of the tray in a direction perpendicular to the planar surface of the tray;
      two side panels extending upwards and away from the tray in a direction perpendicular to the planar surface of the tray;
      at least one spool extending from the tray generally perpendicular to and away from the planar surface of the tray, wherein the at least one spool includes a spool body having an arcuate surface and a spool cover with a planar surface perpendicular to the spool body; and
      a transition panel extending upward and away from the planar surface of the tray, the transition panel including a first portion having a planar surface and a second portion extending perpendicularly upward and away from the planar surface of the first portion of the transition panel, the first and second portions of the transition panel being configured to define a bend radius greater than or equal to a minimum bend radius to restrict over bending of the fiber optic cable.

2. The apparatus of claim 1, wherein the tray further comprising a front portion, a rear portion, and a common portion, the front portion being configured to be adjustably attached to one side of the common portion and the rear portion being configured to be adjustably attached to an opposite side of the common portion, thereby allowing the common portion to adjustably extend between the front portion and the rear portion to enable placement of the tray on the equipment cabinet.

3. The apparatus of claim 1, wherein the tray further comprises a front portion and a rear portion, the front portion and the rear portion being configured to be adjustably attached to enable placement of the tray on the equipment cabinet.

4. The apparatus of claim 1, wherein the at least one end panel further comprises two end panels, one of the two end panels including a rear panel.

5. The apparatus of claim 1, wherein the plurality of routing channels comprises four routing channels positioned on four corners of the equipment cabinet, each routing channel having a radius corner.

6. The apparatus of claim 1, wherein the plurality of routing channels further comprising two routing channels being positioned on two corners of the equipment cabinet, each routing channel having a radius corner.

7. A system for storing fiber optic cable and routing the fiber optic cable comprising:
   an equipment cabinet; and
   a tray having:
      a planar surface for accommodating the fiber optic cable, the tray being mounted to an upper end of the equipment cabinet;
      a plurality of routing channels extending along the planar surface, a portion of the routing channels extending along at least one surface of the equipment cabinet generally perpendicular to the planar surface, each of the routing channels defining a bend radius greater than or equal to a minimum bend radius to restrict over bending of the fiber optic cable;
      a central portion to receive fiber optic cable, wherein the plurality of routing channels being in communication with the central portion and extending downward towards equipment supported by the equipment cabinet;
      at least one end panel extending upwards and away from an end of the tray in a direction perpendicular to the planar surface of the tray;

two side panels extending upwards and away from the tray in a direction perpendicular to the planar surface of the tray;

at least one spool extending from the tray generally perpendicular to and away from the planar surface of the tray, wherein the at least one spool includes a spool body having an arcuate surface and a spool cover with a planar surface perpendicular to the spool body; and a transition panel extending upward and away from the planar surface of the tray, the transition panel including a first portion having a planar surface and a second portion extending perpendicularly upward and away from the planar surface of the first portion, the transition panel being configured to define a bend radius greater than or equal to a minimum bend radius to restrict over bending of the fiber optic cable wherein the tray is configured to be attached to the equipment cabinet.

8. The system of claim 7, wherein the tray further comprises, a front portion, a rear portion, and a common portion, the front portion being configured to be adjustably attached to one side of the common portion and the rear portion being configured to be adjustably attached to an opposite side of the common portion, thereby allowing the common portion to adjustably extend between the front portion and the rear portion to enable placement of the tray on the equipment cabinet.

9. The system of claim 7, wherein the tray further comprises two sections, a front portion and a rear portion, the front portion and the rear portion being configured to be adjustably attached to enable placement of the tray on the equipment cabinet.

10. The system of claim 7, wherein the at least one end panel further comprises two end panels, one of the two end panels including a rear panel.

11. The system of claim 7, wherein the plurality of routing channels comprises four radius corners, with each corner of the tray having a radius corner.

12. The system of claim 7, wherein the plurality of routing channels comprises two routing channels being positioned on two corners of the equipment cabinet, with each routing channel having a radius corner.

13. A method for storing and routing fiber optic cable to an equipment cabinet comprising:

mounting a storage tray to an upper end of the equipment cabinet; the tray having:
   a planar surface for accommodating the fiber optic cable;
   a plurality of routing channels extending along the planar surface and having a portion thereof extending along at least one surface of the equipment cabinet generally perpendicular to the planar surface, each of the routing channels defining a minimum bend radius to restrict over bending of the fiber optic cable; and
   a central portion for accommodating the fiber optic cable, wherein the plurality of routing channels being in communication with the central portion and extending downward towards equipment supported by the equipment cabinet; the central portion having three sections, a front portion, a rear portion, and a common portion, the front portion being configured to be adjustably attached to one side of the common portion and the rear portion being configured to be adjustably attached to an opposite side of the common portion, allowing the common portion to adjustably extend between the front portion and the rear portion to customize the tray for placement on the equipment cabinet;
   at least one end panel extending upwards and away from the tray in a direction perpendicular to the planar surface of the tray;
   two side panels extending upwards and away from the tray in a direction perpendicular to the planar surface of the tray;
   at least one spool extending from the tray generally perpendicular to and away from the planar surface of the tray, wherein the at least one spool includes a spool body having an arcuate surface and a spool cover with a planar surface perpendicular to the spool body;
   a transition panel extending upward and away from the planar surface of the tray with a first portion being a planar surface and a second portion extending from the first portion upward and away from the planar surface of the first portion, the transition panel being configured to conform to the bend radius requirements to prevent over bending of the fiber optic cable;

routing the fiber optic cable into the tray;

using the spools to store the excess fiber optic cable;

routing the fiber optic cable to one of the routing channels; and connecting the fiber optic the cable to a piece of equipment in the equipment cabinet.

* * * * *